United States Patent [19]

Niedermeyer

[11] 4,190,037
[45] Feb. 26, 1980

[54] SOLAR ENERGY COLLECTOR

[76] Inventor: William P. Niedermeyer, 1024 Mt. Mary Dr., Green Bay, Wis. 54301

[21] Appl. No.: 828,497

[22] Filed: Aug. 29, 1977

[51] Int. Cl.² ............................................. F24J 3/02
[52] U.S. Cl. .................................... 126/438; 350/299; 350/288
[58] Field of Search ............... 126/270, 271; 237/1 A; 350/288, 293, 294, 299, 295, 296, 310

[56] References Cited

U.S. PATENT DOCUMENTS

| 811,274 | 1/1906 | Carter | 126/271 |
|---|---|---|---|
| 3,841,738 | 10/1974 | Caplan | 126/271 |
| 3,951,128 | 4/1976 | Schoenfelder | 126/271 |
| 3,990,914 | 11/1976 | Weinstein et al. | 126/271 |
| 4,071,017 | 1/1978 | Russell et al. | 126/271 |
| 4,078,549 | 3/1978 | McKeen et al. | 126/271 |

FOREIGN PATENT DOCUMENTS

| 2635436 | 3/1977 | Fed. Rep. of Germany | 126/271 |
|---|---|---|---|
| 937904 | 4/1948 | France | 126/271 |

Primary Examiner—James C. Yeung
Attorney, Agent, or Firm—Francis J. Bouda

[57] ABSTRACT

This invention relates to the construction of a solar collector reflector surface which permits the use of semi-rigid or flexible materials for the reflector surface. The basic principle involves the use of curved support members and methods for forming same whereby the members support and restrain said reflector material in a predetermined plane or predetermined curved planar surface.

9 Claims, 15 Drawing Figures

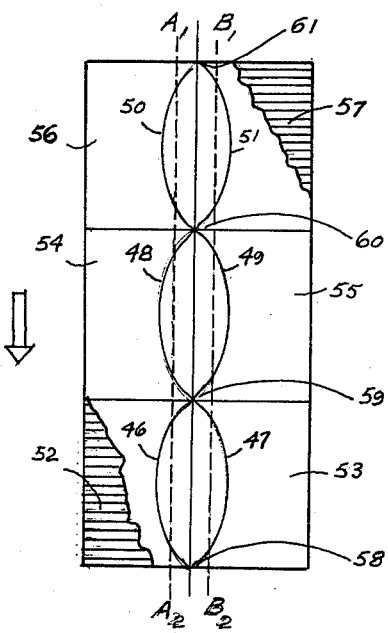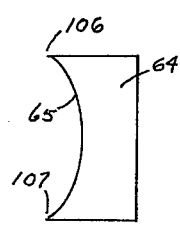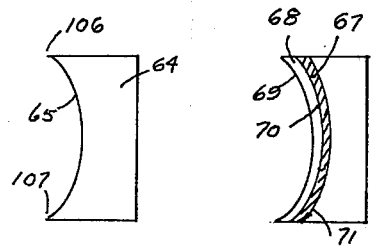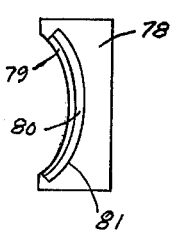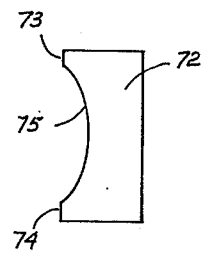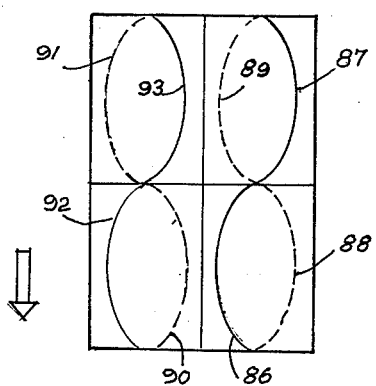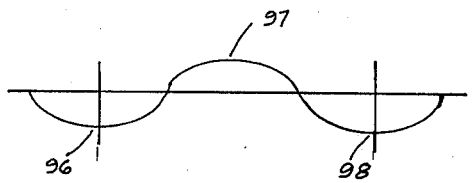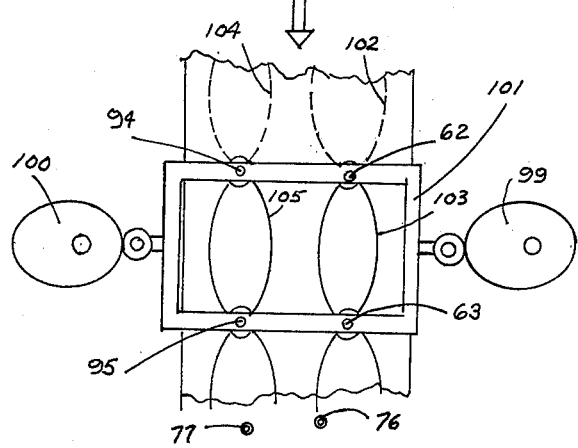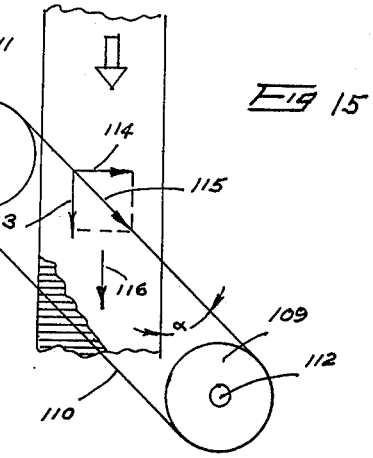

SOLAR ENERGY COLLECTOR

BACKGROUND OF THE INVENTION

This invention teaches the use of inexpensive materials in web or sheet form and methods for fabricating same to provide substantial cost reductions in a solar ray collector assembly, especially solar concentrator assemblies which employ the use of curved focusing surfaces.

The use of parabolic reflector surfaces to direct solar rays to a focal point is old art, for example, U.S. Pat. No. 1,704,173.

Numerous other patents also relate the general principle of concentrating solar rays to a focal point, for example, parabolic shapes of U.S. Pat. Nos. 1,989,999; 2,688,922; 3,300,393; and 3,923,039.

While each of these teachings have modifications or adaptations for special use, a common feature of each is the use of a reflector plate having a rigid surface between supports placed at the terminal ends of the reflector surface, or the use of a flexible reflector supported by a continuous sub-member in order to prevent deflection (which causes misdirection of reflected rays and loss of efficiency). Although intermediate, upper convex supports can be used to prevent excessive deflection, these additional supports interfere with incoming solar rays and reduce total effectiveness.

U.S. Pat. No. 1,855,815 shows a parabolic reflector to focus rays on an axial, cylindrical, fluid-carrying tube and an arrangement to pivot the reflector about the tube axis. U.S. Pat. No. 1,946,184 shows the central tube with a concentric transparent outer tube which supports a parabolic reflector element about the central tube.

For many years, these prior art teachings were alone in describing the basic principle of reflection-concentration along a focal line until U.S. Pat. No. 3,847,136 taught a simplified construction using a flexible reflector surface placed on the top surface of a formed or molded plastic member (which has a semi-cylindrical upper concave contour) to reflect rays to an axial fluid-carrying heat transfer tube. The collector in U.S. Pat. No. 3,847,136 shows the combination of a stiff, self-supportive member and a flexible reflective surface placed within the concave trough of the self-supportive member, and also shows end supports with a pair of bearings to allow pivoting of the structure about the central tube. U.S. Pat. No. 3,847,136 shows a member made of foamed or expanded plastic and uses a monolithic, shaped member to obtain axial and transverse rigidity for reflective accuracy. This teaching requires a fairly heavy cross-section directly below the nadir of the curve to prevent transverse deflection, and substantial continuous longitudinal thickness to prevent axial deflection.

In order to reduce weight and costs of the reflector of the present invention, I use a novel construction whereby the reflective surface is shaped by supporting it by laminated or spaced segments made from inexpensive web or flat sheet materials. This invention does not claim the continuous contoured member as being self-supportive, but rather is directed to the use of a plurality of laminated or spaced-apart supportive members in combination with a supportive planar subsurface (or spaced apart supports) to overcome axial and transverse deflections.

This construction advantageously lends itself to parabolic shapes which have large apertures and minimizes material requirements between the nadir of the paraboloid and the substructure. The reflective surface substrate can also be selected from a wide range of semi-rigid to flexible materials, as, for example, light gauge metals sheets which require only intermittent parabolic shaped supporting members, thus reducing weight and cost. With large aperture reflective surfaces, higher concentration ratios become possible as long as high accuracy of the parabolic curve is maintained. The present invention teaches a unique combination of elements to achieve this, and also teaches a method for fabricating the concave parabolic supporting member continuously and with high accuracy.

SUMMARY OF THE INVENTION

The primary object of this invention is to provide a solar energy collector wherein the reflector surface is supported by light-weight, spaced-apart support members which are fabricated very accurately.

A further object of this invention is to provide parabolic shaped support members whereby the accuracy of fabrication will result in higher efficiencies and allow construction of reflectors with higher concentration ratios.

Another object of this invention is to provide shaped supportive members whereby special reflective shapes can be made easily, accurately, and inexpensively from light-weight materials by use of heated wires or water jet cutters.

Another object of this invention is to provide a method for fabricating parabolic-shaped or other curved supports for solar-ray reflectors in a continuous process at low cost.

DESCRIPTION OF THE DRAWINGS

FIG. 7 shows one method of making parabolic shaped support structures of the present invention.

FIG. 8 shows a plan view of a single parabolic reflector adapted to support a reflective coated substrate.

FIG. 9 is a plan view similar to FIG. 8 and shows an insulating member interposed between the shaped support and the reflective surface substrate.

FIG. 10 is a plan view of a single parabolic shaped reflector with load bearing surfaces at each end of the parabolic curve.

FIG. 11 is a plan view similar to FIG. 10, and shows an insulating piece interposed between the shaped support and the reflective surface substrate.

FIG. 12 is a graphical representation of a plurality of parabolic curves (alternately plotted plus and minus) illustrating the use of cams to define parabolic supports according to the method herein described.

FIG. 13 shows a generally schematic plan view of a mechanism used in the novel method for producing parabolic shaped reflector supports from a moving web or sheet.

FIG. 14 is a schematic plan view of the arrangement and typical mechanisms for transverse cutting of a moving web into discreet segments.

FIG. 15 is a plan view of another method of making transverse cuts in a moving web.

DESCRIPTION OF THE INVENTION

Figure 1:
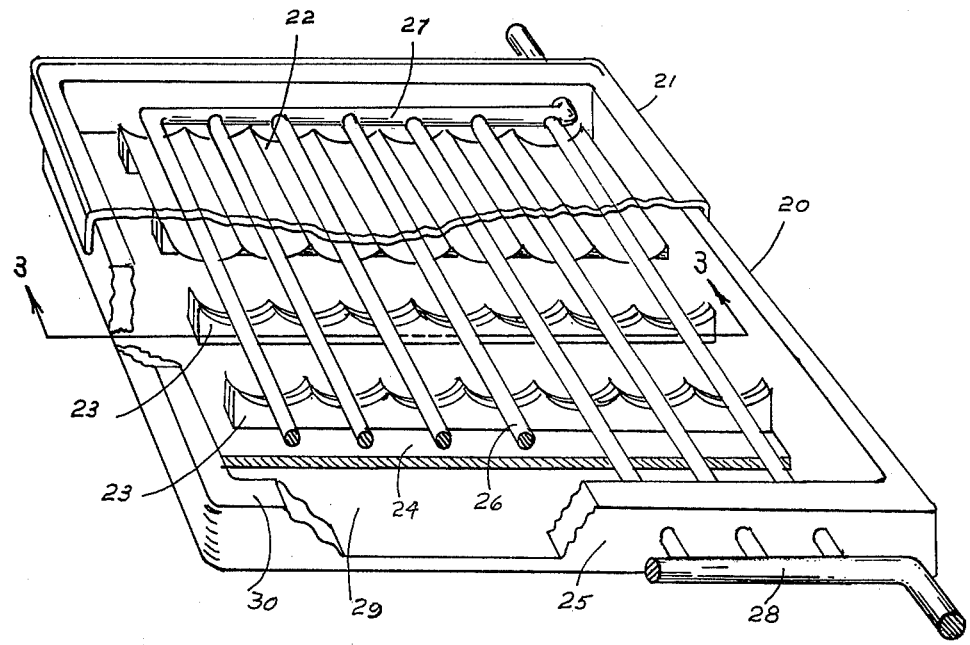
FIG. 1 is a perspective view of a solar energy collector showing one embodiment of the supportive curved members.

FIG. 1 is a preferred embodiment showing a solar energy collector 20 including a transparent cover 21 and a reflective surface 22 which is supported by shaped members 23.

A plurality of members 23 are in turn supported by a planar subsurface 24 which is housed within frame 25. In this embodiment, parabolic shaped supporting members 23 are used in combination with a reflective surface 22 to direct and focus incoming solar rays along a focal line falling within heat absorber member 26. The plurality of absorber member 26 is connected at one end to a common manifold 27 which can be inside frame 25 or can be mounted outside as at 28.

FIG. 1 shows how the space 29 is available for insulating material between the planar subsurface 24 and the reflector 22. Wall 30 can also be insulated or made of non-conductive materials.

The novelty of construction resides in the use of flat sheets or web materials (such as expanded polyurethane plastics or corrugated paperboard) for the shaped supports 23 since this inexpensive material can be fabricated accurately to define a parabolic shape from a wide range of "P" values assigned in the formula $X^2 = 2PY$. As "P" values increase, the parabolic curve increases, and with methods described hereinafter for close-cutting tolerances, panels with larger apertures and higher concentration ratios can be achieved than with previous reflector construction.

Figure 2:
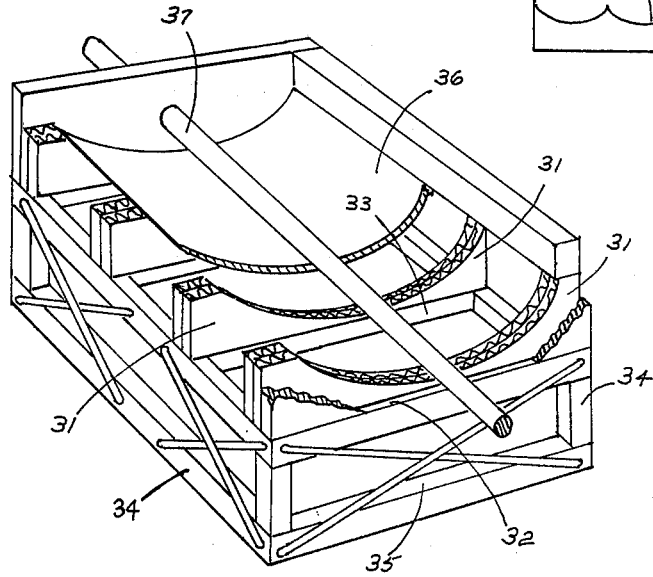
FIG. 2 is a perspective view of a single reflector surface, novel curved supportive means, and a typical substructure to minimize deflection of the reflector surface.

FIG. 2 shows an embodiment of the invention wherein the parabolic curved support 31 is cut in such a way that there is only a small amount of material left between the nadir of the curve and the bottom surface 32 of the support.

In FIGS. 1 and 2, the spaced shaped reflector surface supports are shown supported by a planar surface; however, where deflection of the shaped support member 31 is minimal and does not substantially affect efficiency, it is part of this teaching to consider the spaced support members to be self-supporting in a direction transverse to the axis of the focal line. It is also within the scope of this invention to consider a plurality of supports 23 and 31 to be laminated to form a continuous longitudinal parabolic reflector support member, said shape requiring subsupports to prevent longitudinal deflection due to the compressibility of expanded plastic or corrugated paperboard materials.

FIG. 2 shows large aperture reflector supports 31 being supported by transverse members 33, said supporting members being terminally connected to side supports or truss-like assemblies 34 having cross braces 35. If preferred, side supports 34 can be fabricated from plates or other thin, reinforced members. The parabolic reflector surface 36 directs reflected solar rays along a focal line which falls within absorber 37.

Figure 3:
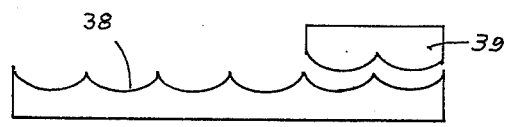
FIG. 3 is a cross-sectional view of a plurality of parabolic curved shapes taken on line 3—3 of FIG. 1, which shapes support a thin flexible reflector surface and substrate.

FIG. 3 shows a plurality of reflector surfaces 38 in side by side relationship which arrangement allows for maximum efficiency. Cutout portion 39 will normally be discarded but might be advantageously used as a reflector substrate retainer. In other embodiments, it is within the scope of this invention to use part 39 as an upper reflective surface support.

Figure 4:
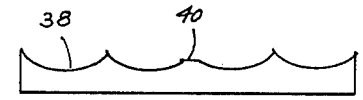
FIG. 4 shows a cross-section similar to FIG. 3, with a central, generally flat, intermediate load-bearing surface.

FIG. 4 shows a shaped supporting member with a centrally located flat surface 40, said surface being a load bearing surface for mounting a longitudinally oriented cover support member (not shown).

Figure 5:
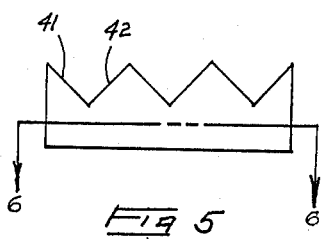
FIG. 5 shows a cross-section similar to FIG. 3, said section defining another embodiment.

FIG. 5 shows a special reflector support member having opposed 45 degree planar support surfaces 41 and 42.

Figure 6:
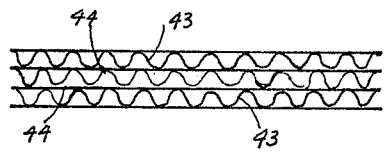
FIG. 6 is a cross-section along line 6—6 of FIG. 5, showing a preferred embodiment wherein corrugated material is orientated to define maximum load supporting capability.

FIG. 6 is a cross sectional view from FIG. 5, said view showing that the support members 23 and 31 can advantageously be made from a plurality of corrugated sheets 43 and intermediate sheets 44 oriented with the longitudinal direction of flutes arranged substantially parallel to the direction of incoming solar rays.

FIGS. 7 through 15 define the shaped support member and a novel method for high speed production of these members.

FIG. 7 represents a rectangular section of multi-ply corrugated paperboard arranged to be moved in the direction of the arrow. Processing can be done on a continuous basis; however, the method described and scope of this invention includes batch processing of individual sheets of material. In FIG. 7., the parabolic curves 46 through 51 can be cut from a moving web to form a plurality of support members 52 through 57. Curved cutting line 46-49-50 defines the parabolic shapes of consecutive but opposed support members. By arranging cutting device 62 of FIG. 14, the above line 46-49-50 will be generated. By arranging a second cutting device in spaced relation and on the same line parallel to the direction of the web flow, said second cutting device 63 of FIG. 14 will generate cutting line 47-48-51.

By arranging the two cutting devices on the same line with respect to web direction, in spaced relation, and a distance apart equal to a straight line between any two consecutive intersection points 58, 59, 60, 61, the secondary cutting device 63 is displaced one repeat length from cutting device 62. Cutting device 62 will cut curve 47-48-51, while the second cutter 63 will cut curve 46-49-50, with corresponding points on curves 49 and 47 being cut simultaneously by cutters 62 and 63 respectively, corresponding points on curves 50 and 48 being cut simultaneously by cutters 62 and 63 respectively etc., etc. In FIG. 7, the top portion of the outer linerboard is cut away to show the preferred direction of corrugations when using corrugated medium.

By using a transverse cutting device arranged per FIG. 15, and as described hereinafter, transverse cut lines coincident with any two consecutive intersection points will separate the parabolic support members into individual support segments per FIG. 8.

FIG. 8 shows a typical support member 64 produced by the above method wherein a parabolic curve 65 is defined by formula $X^2 = 2PY$. In this case the reflective surface would be coincident with curve 65 and the reflective substrate would be very thin. In practice curve 69 of FIG. 9 can be altered to compensate for any thickness $T_1$ of the reflective substrate 68 of FIG. 9. For example, the formula for curve 70 will be $X = \sqrt{2PY} - T_1$ where $T_1$ is equal to the thickness of the reflector substrate. In some embodiments it may be advantageous to place a strip of insulation material 67 between the reflector substrate 68 and the support member 66. In this case curve 71 is defined by the formula $X = \sqrt{2PY} - (T_1 + T_2)$ where $T_2$ equals the thickness of the insulator.

FIG. 10 shows a typical support member 72 with load bearing surfaces 73 and 74. These surfaces are cut by using fixed cutting devices and 76 and 77 of FIG. 14 cutting along lines $A_1$-$A_2$ and $B_1$-$B_2$ of FIG. 7. In FIG. 10, curve 75 is defined by formula $X^2 = 2PY$.

FIG. 11 shows a support 78, a reflector surface substrate 79, insulator 80 and curve 81, said curve defined by formula $X = \sqrt{2PY} - (T_1 + T_2)$, $T_1$ and $T_2$ being defined as the thickness of the reflector and the insulator respectively.

FIG. 12 shows a method for producing a multiplicity of support members like FIG. 3 by using a second set of cutting devices 94 and 95 of FIG. 14. Operation is similar to the above described method, and it is within the scope of this invention that additional sets of transverse cutters can be used for producing a multiplicity of supports or segments of supports. In FIG. 12, a cutting device like 62 will cut along consecutive curves 88–89, cutter 63 on curves 86–87, cutter 94 on curves 90–91 and cutter 95 on curves 92–93, to form supports per FIG. 3. When transverse cuts are made to coincide with the intersection points between any two consecutive but opposed curves, support segments shown in FIGS. 8–11 are formed.

FIG. 13 shows a sequence of co-extending parabolic curves of equal but alternating plus or minus values. A typical cam profile is shown between low points 96 and 98. Cam surface would follow the described curve, for example, starting at low point 96, gradually increasing to high point 97, and gradually decreasing back to low point 98, which is at the same level as point 96.

FIG. 14 plan view schematic showing cams 99 and 100 arranged so that rotation clockwise from the position shown results in transverse movement of structure 101 to the right, hence cutter 62 cuts dotted curve 102, cutter 63 cuts curve 103, cutter 94 cuts curve 104 and cutter 95 cuts curve 105. The cams are in mechanical timed relationship with web speed, this relationship resulting in the cutting of one parabolic curve by one cutter, said curve being substantially equal to $X^2 = 2PY$ while said web moves a linear distance equal to the chordal distance of the aperture of the curve, for example, a straight line between points 106 and 107 of FIG. 8. Modified curves are within the scope of this invention.

FIG. 15 is a plan view schematic of the method used to produce transverse cuts. Sprocket 108 on vertical shaft 111 and sprocket 109 on vertical shaft 112 support a continuous chain 110. Chain 110 is arranged with lugs and holders for the cutting devices. One receptacle is used for each cutter with individual feed lines to each receptacle/cutter being centrally placed substantially above the chain-sprocket "carousel." Each cutter nozzle is placed within a separate receptacle, said receptacles each supported by freely rotatable bearings to prevent torsional forces to accumulate, thus preventing rupture of the power or feed lines to the cutters.

In FIG. 15, the chain-sprocket assembly is adjustably arranged at some angle "a" to the direction of web flow and in mechanically timed relationship such that the velocity vector 113 of motion 115 is equal to velocity 116 of the web and results in a transverse cut parallel to vector 114. The scope of this method includes use of a third pivoting idler sprocket to accomodate different chain lengths so that the mounting distance between two consecutive receptacles for cutter nozzles can be changed in combination with the required angle "a," thereby changing the distance between two consecutive transverse cuts. Slotted gearing or equivalent means in the drive train allows for initial synchronization of cut lines with the inflection points between two consecutive curves.

It is to be understood that the present invention may be embodied in other specific forms without departing from the spirit or special attributes hereof, and it is, therefore, desired that the present embodiments be considered in all respects as illustrative, and, therefore, not restrictive, reference being made to the appended claims rather than to the foregoing description to indicate the scope of the invention.

Having thus described my invention, what I claim as new and desire to protect by Letters Patent are the following:

1. A solar energy collector including;
    a heat collector means,
    a reflective means which is a single flexible sheet of longitudinal parabolic configuration arranged to collect, concentrate, and direct solar rays toward the heat collector means,
    heat transfer fluid in contact with said collector means at a distance from said reflective means,
    said collector means being conductive and coated with absorptive means for improving heat transfer to said heat transfer fluid, and arranged co-incident with the focal line of a parabolic curve, said curve calculated according to any value of P in formula $X^2 = 2Py$,
    a plurality of non-conductive support members disposed in full contacting transverse relationship with said reflector means from zenith to zenith of same, and being spaced from each other,
    said support members having major planar surfaces disposed in transverse relationship to the axis of the reflector means,
    said planar surfaces each having a bottom edge and a top edge, said top edges being parabolic in shape, the projection of said bottom edge having a length equal to a straightline distance between the zeniths of said parabolic shape of the reflective means,
    the said reflective means being in continuous contact with and supported by the top edges of said support members, whereby the spaced apart support members underlie, and provide intermittant load bearing surfaces for, the said reflective means.

2. In the device of claim 1, said support members being made of corrugated paperboard with the axes of all corrugations being disposed substantially parallel to the direction of solar rays.

3. In the device of claim 1, said support members operatively combined with a plurality of reflective means and a plurality of collector means, each reflective means directing rays to an adjacent collector means.

4. In a device of claim 3, said support members operatively combined with said reflective means to define a unitary structure which directs solar rays to the collector means which is disposed parallel to the longitudinal axis of the reflective means.

5. In the device of claim 3, said shaped support members having portions of at least some of them removed to provide spaced upper load bearing surfaces which are discontinuous in both longitudinal and transverse directions, said load bearing surfaces being symmetrical about a line which is centrally located between two adjacent nadirs of the parabolic configuration and being spaced apart to provide spaced bearing areas along said line.

6. In the device of claim 5, the portions of said shaped support members which were removed being adjacent the curved portion of the parabolic configuration of the reflective means whereby to provide load bearing surfaces for the reflective means.

7. In a device of claim 1, said spaced apart support members each connected at its ends to, and supported by, rigid members parallel to the longitudinal axis of the reflector surface.

8. In the device of claim 7, said support members being in planar juxtaposed contacting relationship to form a transverse laminated continuous parabolid shaped trough, said laminated trough being supported by the rigid members.

9. In the device of claim 1, wherein said reflective surface is a thin gauge metallic foil bonded to a non-conductive substrate.

* * * * *